Nov. 2, 1954
B. FUENTE
2,693,003
SHIMMY DAMPER INSTALLATION WITH
CONSTANTLY ENGAGED LEVERS
Filed Dec. 20, 1950
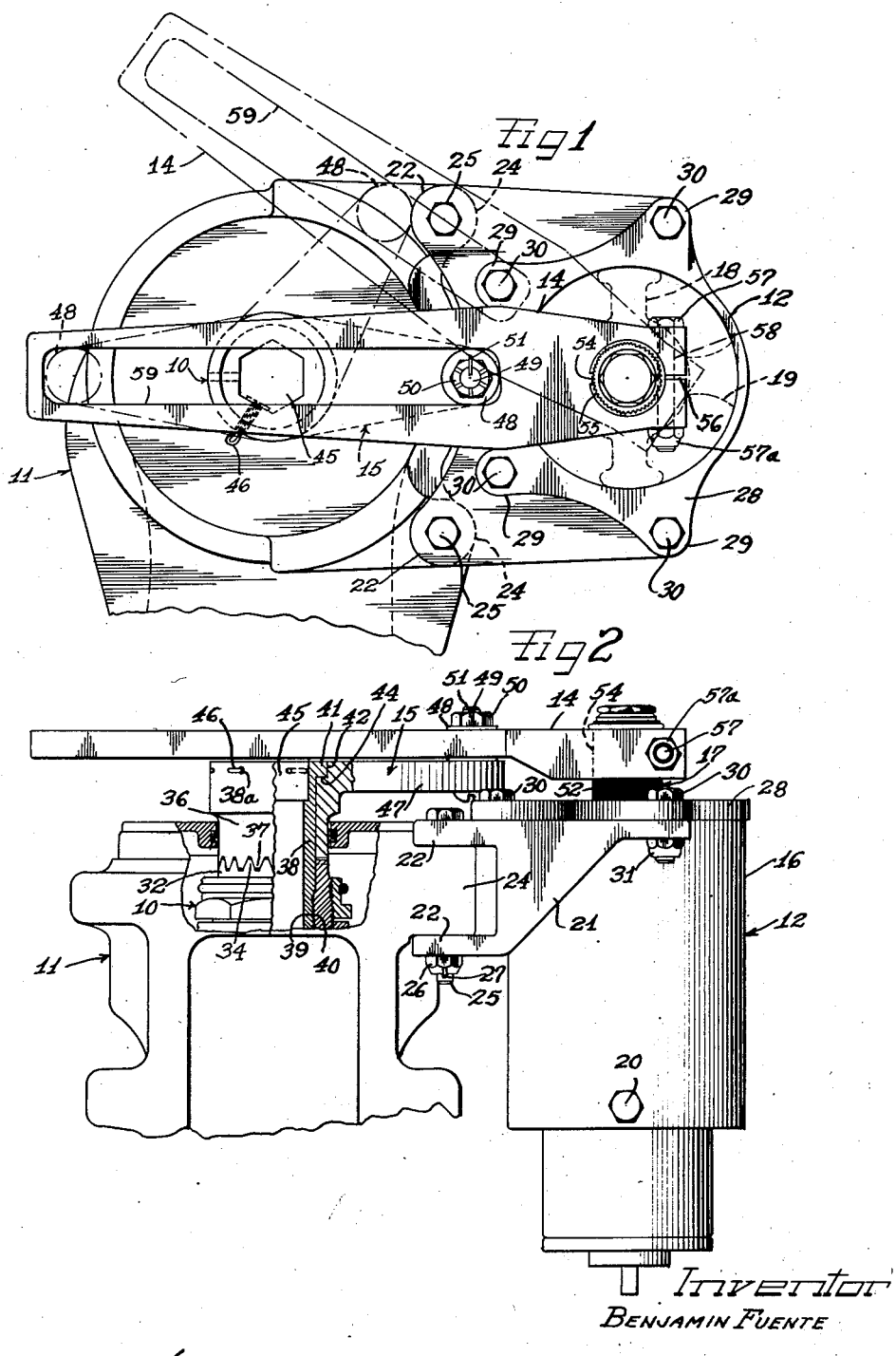
Inventor
BENJAMIN FUENTE

United States Patent Office 2,693,003
Patented Nov. 2, 1954

2,693,003

SHIMMY DAMPER INSTALLATION WITH
CONSTANTLY ENGAGED LEVERS

Benjamin Fuente, Hamburg, N. Y., assignor to Houdaille-Hershey Corporation, Detroit, Mich., a corporation of Michigan Application December 20, 1950, Serial No. 201,811

6 Claims. (Cl. 16—35)

This invention relates to an improved damper installation for damping vibratory or shimmy oscillations of a caster wheel assembly of a vehicle such as an airplane.

Apparatus of the present invention is especially useful in connection with the nose wheel landing gear assemblies of airplanes embodying tricycle landing gear in order to prevent high frequency vibrations or shimmy of the wheel assembly with respect to the airplane during high speed movement of the plane along the ground such as during landing or takeoff. In such an application it is desirable that the wheel assembly be fully rotatable through 360° with respect to the support structure. It is also desirable that the wheel assembly have a portion constantly engaged with the coupling member which is operatively attached to the damping means.

Although the invention is herein described in connection with an aircraft nose wheel assembly, it will be understood that it is equally applicable to any swivel wheel assembly on any type of vehicle, and therefore the invention is not to be restricted to this one application.

An object of the present invention is to provide a constantly engaged shimmy damper installation which will permit full 360° swivelling of a caster wheel assembly with respect to the support structure.

Another object of the invention is to provide an expeditious means for damping high frequency oscillations of a swivelly mounted wheel assembly and including a shimmy damper constantly engaged by a lost motion connection with the wheel assembly for varying the damping effect on the wheel assembly from zero to a maximum value at the normal position of the wheel assembly.

A further object of the invention is to provide an improved caster wheel shimmy damper installation including a wheel assembly portion constantly engaged with a shimmy damper member and allowing full operative castering of the wheel assembly with respect to a vehicle.

Other and further objects, features and advantages of the present invention will be apparent to those skilled in the art from the following detailed description of a preferred example thereof, reference being had to the accompanying drawings, in which:

Figure 1 is a fragmentary, top plan view of a shimmy damper installation according to the present invention; and Figure 2 is a fragmentary side elevational view of the shimmy damper installation shown in Figure 1 with certain portions broken away and in section to reveal details of structure.

In Figures 1 and 2, a portion of a swivelled wheel or caster assembly 10 is shown rotatably mounted in a relatively fixed wheel support structure 11 which, in turn, is attached to a vehicle such as an airplane (not shown). In order to damp high frequency oscillations or shimmy of the wheel assembly 10 with respect to the support structure 11, shimmy damper means are provided, and such means comprise generally a rotary type fluid shimmy damper 12, a damper lever arm member 14 and a wheel assembly lever arm 15.

The shimmy damper 12 has a casing 16 which is of generally cylindrical configuration and an operatively retained axially extending rotary piston wing or vane shaft 17. Any suitable type of damping means may be provided within the casing 16 and herein such means are shown as a pair of vanes 18 fixed longitudinally in diametrically opposite positions along the rotary shaft 17 within the casing 16 and a pair of abutments 19 fixed with respect to the casing 16 and in diametrically opposed positions therein, normally located at substantially 90° to the vanes 18. The spaces within the casing 16 between the vanes 18 and the abutments 19 provide working chambers which are filled with hydraulic fluid such as oil. Appropriate metering means (not shown) control displacement of the fluid between the chambers in response to movement of the vane shaft 17. A filler cap 20 covers an opening (not shown) through which fluid may be introduced into the casing 16.

In order to fixedly attach the shimmy damper 12 to the wheel support structure 11 an attachment bracket or fitting 21 is provided. The fitting 21 has a pair of yoke attachment portions 22 at each side thereof which matingly receive a pair of flat ended integral boss portions 24 of the support structure 11 between the yoke arms thereof. Coaxial holes (not shown) through the mating yoke and boss portion receive bolts 25, and the bolts are retained therein by means of nuts 26 and cotter pins 27 in order to fixedly secure attachment fitting 21 to the wheel support structure 11. An upper flange portion 28 of the shimmy damper 12 is provided with integral radially outwardly extending ears 29, herein shown as four in number, which are disposed over adjacent portions of the fitting 21. Bolts 30 are inserted through coaxial holes (not shown) in the ears 29 and the fitting 21 and are secured therein by means of nuts 31 in order to fixedly secure the shimmy damper 12 with respect to the fitting 21.

The wheel assembly 10 is retainingly journaled in the wheel support structure 11 in any suitable manner (not shown). An upper shaft portion 32 of generally annular configuration, is provided with upwardly extending teeth 34 (Figure 2) about its entire upper end. The wheel assembly lever arm 15 has an integral generally annular portion 36 with downwardly extending teeth 37 in mating engagement with the teeth 34 of the upper shaft portion 32.

Means are herein provided for retaining the shaft portion 32 and the annular portion 36 of the lever arm 15 in coaxial locked engagement, and such means comprise the mating teeth 34 and 37 in conjunction with an annular locking sleeve 38 having a lower externally threaded end portion 39 in threaded engagement with internal threads 40 formed about the inner annular periphery of the shaft 32. The outer periphery of the locking sleeve 38 is in conforming engagement with the adjacent inner peripheral surface of the lever arm annular portion 36 and the shaft 32, and a radially outwardly extending internal flange 41 is provided about the upper end portion of the locking sleeve. The annular flange 41 is disposed in a complementary annular rabbet groove 42 formed in the upper surface of the lever arm 15 coaxial with the annular portion 36 and providing an abutment shoulder 44 for opposing the annular flange 41 in order to retain the mating teeth 34 and 37 in fixed engagement for fixedly attaching the lever arm 15 to the wheel assembly 10.

An internal hexagonal socket 45 is provided in the upper end portion of the locking sleeve 38, substantially coaxial therewith, in order to provide means for inserting a wrench (not shown) to tighten or loosen the sleeve. In order to prevent inadvertent loosening of the locking sleeve 38 a plurality of safetying holes 38a are provided about the periphery of the sleeve 38 and the corresponding upper periphery of the lever arm annular portion 36. A cotter pin 46 may be secured through any substantially coaxial pair of such holes.

For providing an actuating portion for the lever arm 15, an integral arm 47 extends radially outwardly from the upper end portion of the annular portion 36. A roller 48 is rotatably secured at the upper side of the free end portion of the arm 47 by means such as a machine screw 49 extending upwardly through a hole (not shown) through the arm 47. A nut 50 is threadedly disposed over the upper end portion of the screw 49 over the upper end of the roller 48, and the nut is safetied by means of a cotter pin 51.

Means are provided for operatively connecting the coupling lever arm 15 through the roller 48 to the shimmy damper 12. In the present instance such means comprise the damper arm 14 which is in the form of an elongated bar providing an arm extending from the wing shaft 17. In order to provide a fixed attachment between the wing shaft 17 and one end portion of the damper arm 14, the protruding end portion of the shaft 17 is provided with a plurality of serrations 52 covering the entire exposed peripheral surface of the vane shaft. A vertical hole 54 is formed through one end portion of the damper arm 14 and a plurality of serrations 55 are provided about the defining surface of the hole 54. The serrated end portion of the wing shaft 17 is inserted into the hole 54 with the serrations on the opposing surfaces in mating, locked engagement.

In order to insure a positive locking engagement between the damper arm 14 and the shaft 17, the end portion of the damper arm is provided with a longitudinal slot 56 formed in a vertical plane in order to allow contracting of the periphery of the hole 54 like a split clamp about the protruding end of the shaft 17. A bolt 57 is inserted through a transverse hole 58 through the split portion of the arm 14, longitudinally outwardly of and at right angles to the hole 54. A nut 57a is threadedly inserted over a threaded end portion of the bolt 57 for tightening the same to provide a tight clamping engagement between the split arm portion and the shaft 17.

For operatively connecting the coupling roller 48 to the damper arm 14, a closed elongated longitudinal slot 59 is formed in the arm radially with respect to the attached vane shaft 17 and extending for most of the length of the arm. The side walls of the slot 59 are parallel and spaced to afford close clearance slightly greater than the diameter of the roller 48 in order to provide a close rolling engagement therebetween. The roller 48 is disposed within the slot 59, and the slot is of such a length as to permit complete rotation of the wheel assembly 10 without interference between the roller 48 and the ends of the slot and with the roller in continuous engagement with the damper arm 14 regardless of swivelled position of the wheel assembly.

When the wheel assembly 10 is located in normal running position, the damper arm 14 and the lever arm 15 are in the position shown in the solid lines in the figures, with the coupling pin or roller 48 in its closest approach to the vane shaft 17 so that the slot 59 of the arm 14 lies over the rotational axis of the wheel assembly 10. In this position the vanes 18 of the vane shaft 17 are centrally located with respect to the abutments 19 within the shimmy damper casing 16 so that an equal pivoting range is permitted on each side of the normal position shown.

In operation, the greatest damping effect will occur when the greatest relative movement between the lever arm 15 and the damper arm 14 occurs, and it will be apparent from the drawing and the foregoing description that this maximum relative movement and consequent maximum damping effect will be provided at the normal operating position. This damping effect will vary from a maximum at the normal operating position to a zero value with the coupling member in the position shown by the phantom lines in Figure 1 wherein the arms are about right angularly related. It will be understood that such a decrease in damping effect on each side of the normal operating position is highly desirable since the maximum damping is needed at and near the normal operating position, and at a substantial angular distance each side of this position damping is not only unnecessary but undesirable as unnecessarily impeding the rotation of the wheel assembly.

With the arrangement shown the wheel assembly 10 can be rotated through a complete turn without disengagement of the roller 48 from the slot 59 so that there is no danger of loss of damping effect due to inadvertent disengagement of the damper arm 14 or improper reengagement thereof. When the roller 48 is at the extreme outward end of the slot 59, the resistance to rotation of the wheel assembly 10 is very much diminished because of the great mechanical advantage in the long leverage of the damper arm between the roller and the vane shaft, and because of the consequently reduced relative movement between the damper arm and the lever arm 15 corresponding to a given movement of the wheel assembly 10. Thus, the wheel assembly 10 may be easily rotated throughout a complete turn without any substantial resistance to rotation except when in the damping range near the normal operating position at which time relatively slow movement of the wheel assembly is not impeded but high frequency oscillations or shimmy are damped out.

It will be understood that modifications and variations may be effected without departing from the scope of the novel concepts of the present invention.

I claim as my invention:

1. A shimmy damper installation for damping oscillations of a wheel assembly swivelly mounted in a relatively fixed support structure, comprising a shimmy damper fixedly secured to the support structure, a damper lever attached to a pivotal portion of the shimmy damper for operating the pivotal portion between two limit positions, said damper lever having a longitudinal slot therein extending radially with respect to the pivot center, an arm fixedly secured to the wheel assembly and having coupling means attached at the free end portion, said coupling means including a member extending generally vertically relative to said arm and engaged in said slot for pivoting said damper lever between said limit positions, said member being movable in said slot to permit complete rotation of the wheel assembly with respect to the support structure without becoming disengaged from the slot.

2. In an apparatus for damping shimmy of a wheel assembly swivelly mounted in a support structure, a shimmy damper fixedly secured to the support structure and having an axial shaft operatively retained in the damper with an end portion extending therefrom, a single elongated plate-like damper lever fixedly secured to the end portion of said damper shaft for pivoting the same between two limit positions, said damper lever having a longitudinal slot therein extending generally radially with respect to the pivot center, an arm fixedly secured to the wheel assembly and extending at a level below said damper lever and having coupling means attached at the free end portion, said coupling means including an upstanding member generally at right angles to said arm and projecting into said slot for pivoting said damper lever between said limit positions, and being movable in said slot to permit complete swivelling of the wheel assembly with respect to the support structure without becoming disengaged from the slot.

3. An apparatus for damping oscillations of a wheel assembly swivelly mounted in a support structure, comprising shimmy damping means fixedly attached to the support structure, a damper lever attached to a pivotal portion of the damping means for operating the pivotal portion between two limit positions, said damper lever having a longitudinal slot therein extending radially with respect to the pivot center, an arm fixedly attached to said wheel assembly and extending radially with respect to the axis of rotation thereof, a roller rotatably attached at the free end portion of said arm, said roller being operatively engaged in the slot in said damper lever for pivoting the same between said limit position and movable longitudinally in the slot to allow full swivelling of the wheel assembly without disengagement of the roller from the slot.

4. A shimmy damper installation for damping oscillations of a wheel assembly swivelly mounted in a relatively fixed support structure, comprising a shimmy damper fixedly secured to the support structure and having an axial shaft operatively retained in the damper substantially parallel to the axis of rotation of the wheel assembly and with an end portion extending out of the damper, a lever fixedly secured to the end portion of said damper shaft for pivoting the same between two limit positions, said lever having a longitudinal slot therein, an arm fixedly attached to said wheel assembly and extending radially with respect to the axis of rotation thereof, a roller rotatably attached at the free end portion of said arm, said roller being operatively engaged in the slot in said lever for pivoting the same to pivot said damper shaft between said limit positions in response to rotation of the wheel assembly, the greatest relative movement of said lever occurring when the same is midway between said limit positions at which time said wheel assembly is in normal operating position.

5. In a vehicle having a support structure supporting a swivelly mounted wheel assembly, means for preventing shimmy of the wheel assembly with respect to the support structure, said means comprising a rotary fluid damper fixedly secured to the support structure substantially parallel to the swivel axis of the wheel assembly, said damper having an axial shaft operatively retained therein and having an end portion extending therefrom, a damper lever having an end portion fixedly attached perpendicularly to the end portion of the damper shaft for pivoting the same between two limit positions, said damper lever having a longitudinal slot with substantially parallel sides extending radially with respect to the pivotal axis of the lever, an arm member fixedly attached to the wheel assembly substantially perpendicularly to the swivel axis thereof, a roller rotatably attached to the free end portion of said arm member with the roller axis substantially parallel to the swivel axis of the wheel assembly, said roller being operatively engaged in said damper lever slot for pivoting the lever between said limit positions in response to swivelling of the wheel assembly, said roller being movable longitudinally in said slot to permit full swivelling of the wheel assembly and to vary the movement of the damper lever responsive to swivelling of the wheel assembly from a maximum value occurring with the wheel assembly in normal operating position corresponding to a position of said damper lever midway between said limit positions to a zero value with the wheel assembly in position corresponding to either of said limit positions.

6. In a shimmy damper installation, a damper attachment bracket comprising a pair of transversely spaced integral yoke attachment portions, said bracket having a concave arcuate surface formed on the bracket between said yoke attachment portions, and an integral flange portion having integral transversely opposed horizontally extending flat plate-like attachment ears, said flange portion and said ears defining a concave arcuate edge between the ears and longitudinally opposite to said first arcuate surface.

References Cited in the file of this patent

UNITED STATES PATENTS

| Number | Name | Date |
|---|---|---|
| 1,006,831 | Dallemagne | Oct. 24, 1911 |
| 2,275,372 | Magrum | Mar. 3, 1942 |
| 2,379,170 | McDaniel | June 26, 1945 |